United States Patent
Loch et al.

[15] 3,679,046
[45] July 25, 1972

[54] GRAIN AUGER DEVICE

[72] Inventors: George N. Loch, Box 14, Glendon, Alberta; Alphonse Loch, R.R. 2, Tofield, Alberta, both of Canada

[22] Filed: Dec. 29, 1970

[21] Appl. No.: 102,357

[52] U.S. Cl. ................................198/213, 209/283
[51] Int. Cl. ...........................................B07b 1/06
[58] Field of Search ............198/7, 9, 64, 213; 209/283, 209/282, 281

[56] References Cited

UNITED STATES PATENTS 2,706,046  4/1955  Andrews..............................209/283
3,409,119  11/1968  Mayrath..............................198/213

*Primary Examiner*—Evon C. Blunk
*Assistant Examiner*—Hadd S. Lane
*Attorney*—Kent & Ade

[57] ABSTRACT

An elongated opening is formed through the casing of an auger on the underside and a screen is detachably secured over the opening to screen out small weed seeds and the like. This opening is blanked off when not in use and the degree of screening is governed by the volumetric intake of the auger which is adjustable.

1 Claim, 7 Drawing Figures

Patented July 25, 1972
3,679,046
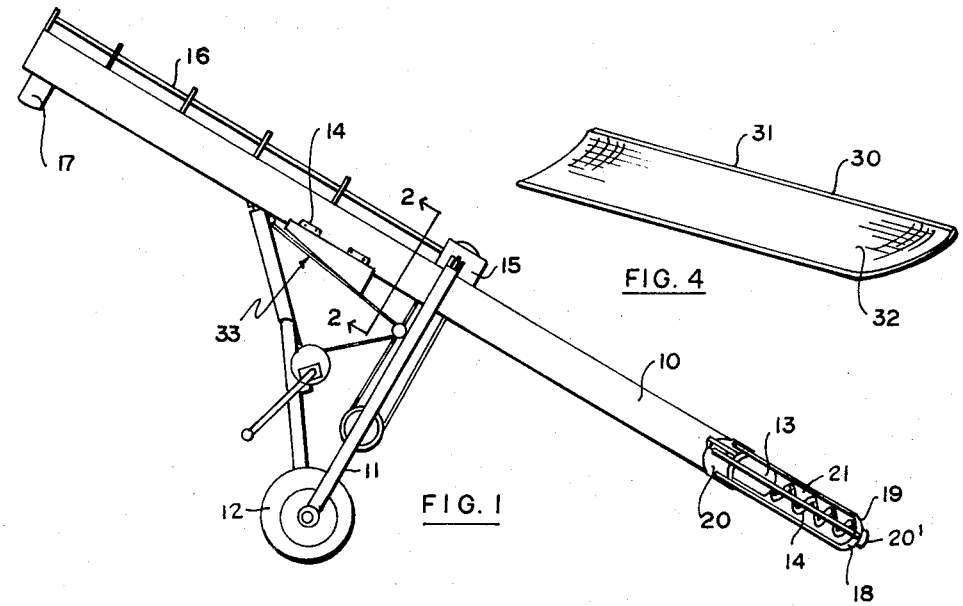
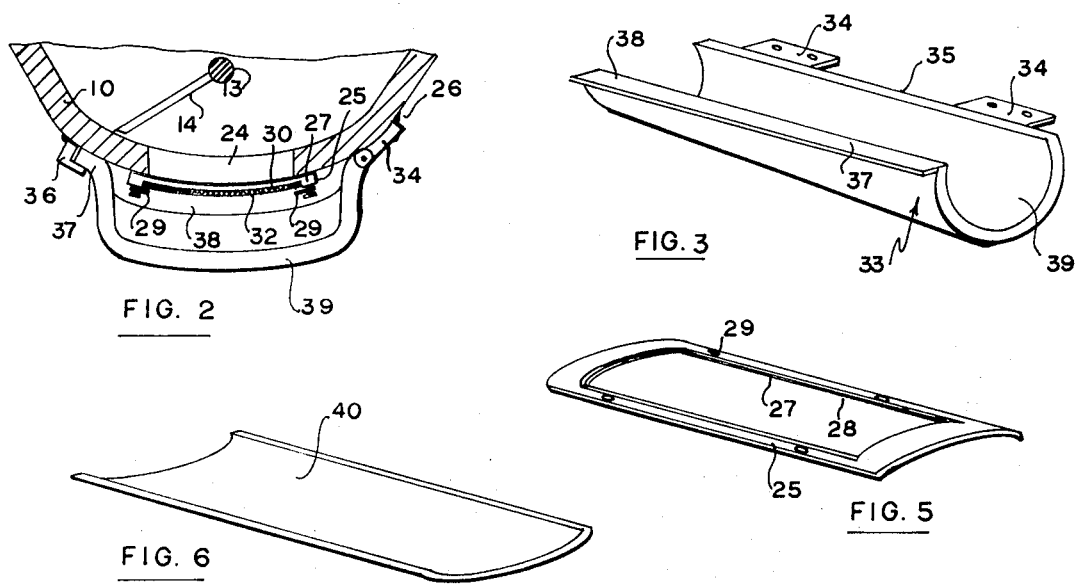
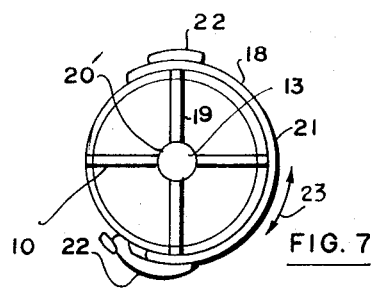
INVENTOR.
GEORGE N. LOCH
BY ALPHONSE LOCH
Kent & Ade

GRAIN AUGER DEVICE

This invention relates to new and useful improvements in grain augers, particularly the provision of a screening device to screen out small weeds, cracked grain and other small material while the grain is being augered from one position to another.

Another object of the invention is to provide a device of the character herewithin described which includes means to control the intake of grain to the auger thus controlling the efficiency of the screening within limits inasmuch as a slower feed of grain through the auger increases the screening process as all of the grain has a chance to pass over the screen.

Conventionally, grain is screened by placing same in a device which is adapted to screen out small weed seeds, wild buckwheat, cracked grain, rape seed, flax and other undesirable seeds.

This means the grain has to be handled which is not only time consuming but also leads to further cracked grain.

The present invention incorporates a screening device in a grain loader or auger so that when ever the grain is being moved from one position to another by the auger, the screening process can be undertaken at the same time if desired.

The device is easily attached to existing grain augers and, when not in use, can be blanked off readily and easily.

The device is simple in construction, economical in manufacture and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying Figures in which:

FIG. 1 is a side elevation of a grain auger loader showing the device in situ.

FIG. 2 is a fragmentary cross sectional view of the grain auger tube and auger showing the device substantially along the line 2—2 of FIG. 1.

FIG. 3 is an isometric view of the shroud per se.

FIG. 4 is an isometric view of the screen per se.

FIG. 5 is an isometric view of the screen frame per se.

FIG. 6 is an isometric view of the blank off plate.

FIG. 7 is an end view of the lower end of the auger showing the shutoff plate portion of the invention. In the drawings like characters of reference indicate parts in the different figures.

Proceeding therefore to describe the invention in detail, reference character 10 illustrates a grain auger tube mounted upon an undercarriage 11 supported by ground engaging wheels 12.

Situated within the tube is an auger shaft 13 having an auger flight 14 surrounding same driven by a source of power (not illustrated) and through gear box 15 and shaft 16 to gears (not illustrated) within the upper end of the auger. This structure is conventional and is not believed necessary to explain or illustrate same further.

The conventional grain auger loader illustrated in FIG. 1 is provided with an upper discharge end 17 and a lower intake end 18.

The lower intake end 18 consists substantially of support bars 19 extending from the end 20 of the auger tube and these bars also support the lower end of the auger shaft 13 within a bearing 20' carried by the bars. An adjustable shutoff plate 21 is situated adjacent this intake end and is mounted within clips 22 secured to the auger casing or tube 10. This shutoff plate is semicircular in configuration and extends around the bars and may be rotated in the direction of the double headed arrow 23 from a position where the intake end is completely uncovered to a position where it is partly shrouded as shown in FIG. 1. Depending upon the position of this intake plate, the volumetric intake capacity of the intake end is variable within limits.

An elongated aperture 24 is formed through the tube wall 10 in the underside thereof and above the undercarriage 11. This aperture is approximately 3 inches wide and 36 inches long but, of course, these dimensions can be varied as desired.

A substantially rectangular frame 25, curved to the curvature of the auger tube 10, is welded to the edges of the tube defining the aperture 24 and this welding is illustrated in FIG. 2 by reference character 26.

A recess 27 is formed around the inner edges 28 of the frame and upon the convex or outer side thereof and small catches 29 are pivoted around the frame and are adapted to overlie the recess 27.

A screen 30 comprises a frame 31 with screening 32 secured thereto and this frame is also curved to compliment the curvature of the auger tube 10. This screen fits within the recess 27 of the frame 25 and lies flush or within the same plane, catches 29 holding same detachably in position.

A shroud shown in FIG. 3 and collectively designated 33 includes a pair of hinges 34 on one edge 35 thereof and these hinges are in turn secured to the auger tube on one side of the aperture 24.

Swivelling catches 36 are mounted on the tube 10 adjacent the other edge bounding the aperture 24 and these catches can engage or disengage within the other flanged edge 37 of the shroud. The upper end 38 of the shroud is curved between the flanged edges 35 and 37 and is spaced from the upper edge of the tube 10 bounding the aperture 24. The lower end 39 of the shroud is also curved and spaced from the lower edge of the tube bounding the aperture 24 but this curved edge end 39 is spaced a greater amount than the end 38 so that the shroud inclines outwardly and away from the auger tube from the upper end thereof towards the lower end thus acting as a chute for screenings passing through the screen 30.

If it is desired not to use the screening device, the screen 30 is removed and a blank plate 40 is inserted in place of the screen within the frame 25. This blank plate is curved to compliment the curvature of the auger tube 10 in a manner similar to the screen 30.

In operation, and assuming that screening is desired, the screen 30 is inserted within the frame 27, it being understood that the size of the screen governs the size of the seeds which will pass therethrough.

The shutoff plate 21 is adjusted to control the volumetric intake of the auger as desired and the auger is rotated to move grain from the intake end, upwardly towards the discharge end 17.

The auger flight passes the grain over the screen 30 covering the aperture 24 within the casing 10 thus screening out small weed seeds, cracked grain and any particles which are smaller than the interstices of the screen. These are collected within the shroud 33 and funnelled downwardly to a convenient discharge position.

The smaller the amount of grain augered by the loader, the greater the screening effect so that the degree of screening is controlled within limits by the shutoff plate 21 as hereinbefore described.

Access to the frame 27 for placement of the screen or blank plate 40 is by hinging the shroud to one side upon the hinges 34.

Various modifications can be made within the scope of the inventive concept which is herein disclosed and/or claimed.

What we claim as our invention is:

1. In a screw-type grain conveyor, the combination of an inclined auger tube having a lower intake end and an upper outlet end and provided at its underside intermediate the ends thereof with an elongated opening, a rotatable auger provided in said tube, an elongated frame secured exteriorly to the underside of said tube around said opening, an elongated screen removably mounted in said frame, an elongated shroud disposed below said frame and said screen for collecting material passing through the screen, said shroud having an open end for discharge of material collected therein, hinges provided at one longitudinal edge of said shroud and attaching the same to said tube adjacent one longitudinal edge of said frame whereby the shroud may be swung from a closed position below said screen to an open position in which the screen may be installed in and removed from said frame, and latches provided on said tube adjacent the other longidutinal edge of said frame for engagement with the adjacent longitudinal edge of said shroud to openably retain the shroud in its closed position.

* * * * *